(No Model.)

U. HASKIN.
Clutch for Rolls.

No. 228,893.  Patented June 15, 1880.

Witnesses.
John K Smith
L. C. Sitler

Inventor.
Uri Haskin
by Bakewell & Kerr
Attorneys

UNITED STATES PATENT OFFICE.

URI HASKIN, OF PITTSBURG, PENNSYLVANIA, ASSIGNOR TO DILWORTH PORTER & CO., (LIMITED.)

CLUTCH FOR ROLLS.

SPECIFICATION forming part of Letters Patent No. 228,893, dated June 15, 1880.

Application filed May 17, 1880. (No model.)

*To all whom it may concern:*

Be it known that I, URI HASKIN, of Pittsburg, in the county of Allegheny and State of Pennsylvania, have invented a new and useful Improvement in Clutches for Rolls; and I do hereby declare the following to be a full, clear, and exact description thereof, reference being had to the accompanying drawings, forming part of this specification, in which—

Figure 1:
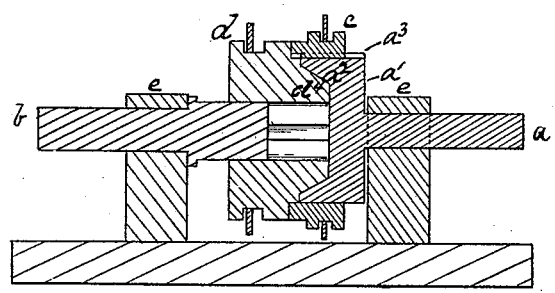
Figure 2:
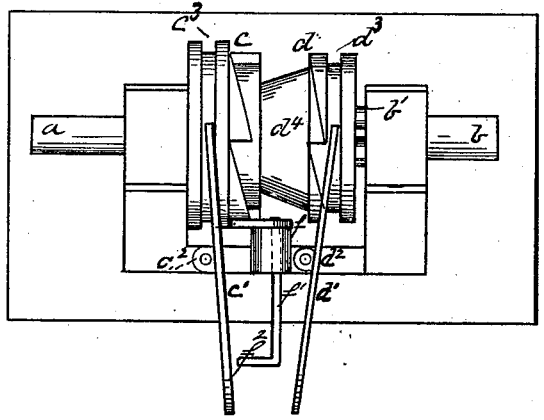
Figure 3:
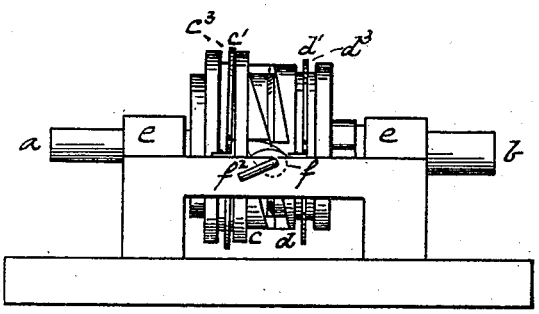

Figure 1 is a sectional view of my improved clutch for rolls. Fig. 2 is a plan view, and Fig. 3 is an elevation.

Like letters of reference indicate like parts in each.

Heretofore clutch devices for making the power-connection with rolls have been constructed of a serrated sliding clutch-collar, which, being thrown into connection with the roll-shaft, brought the full power of the power-shaft suddenly to bear upon the inert roll-shaft. When the train of rolls was heavy the effect of this instantaneous connection was to strain the clutch, and sometimes break it or the pinions or other parts of the mill.

My invention consists of an improved construction of clutch and of means for throwing the clutch into and out of gear, and by means of such construction I am enabled to bring the power-shaft gradually into connection with the roll-shaft, so as to start the rolls before the clutch itself is connected. The result of this construction is to prevent the straining of the clutch and other parts, and to render the same easy of operation and engagement and disengagement with the roll-shaft.

To enable others skilled in the art to make and use my invention, I will now describe its construction and mode of operation.

The power-shaft is shown at $a$ and the roll-shaft at $b$. The clutch consists of two parts, $c$ and $d$, mounted between suitable journal-bearings $e$, operated by bifurcated levers $c'$ $d'$, pivoted at $c^2$ $d^2$ and working in grooves $c^3$ $d^3$. The part $c$, which is the clutch proper, is of the usual construction, being a collar sliding upon a head or pulley, $a'$, on the end of the power-shaft, and connected therewith by means of the feather and spline $a^3$. The inner end of the clutch $c$ is serrated in the usual way, and the inner end of the head $a'$ has a cone-shaped recess, $a^2$.

On the end of the roll-shaft $b$ is a sliding collar, $d$, serrated to correspond with the serrated portion of the clutch $c$ at its inner end, and having a cone-shaped projection, $d^4$, inside of the serrated portion. It is connected to the roll-shaft by means of a feather and spline, $b'$.

At the side of the housing, and arranged between the parts $c$ and $d$, is a cam, $f$, mounted on the shaft $f'$ and provided with a crank, $f^2$. This cam is designed for the purpose of throwing the clutch out of gear, and its eccentric face turns to the side next to the clutch $c$ when thrown into operation. It has no reference at all in its operation to the part $d$, being designed for disconnection with the clutch $c$ alone.

The operation of my clutch device is as follows: When it is designed to put the rolls in operation the part $d$ is thrown toward the clutch $c$ by its lever $d'$, and this causes the cone-piece $d^4$ to come into frictional contact with the recess $a^2$, of which it is the counterpart. This causes the roll-shaft $b$ to turn. When the rotation of the roll-shaft has been established the clutch $c$ is thrown forward and comes into gear with the part $d$ upon the roll-shaft, and thereby establishes complete connection between the power and roll shafts.

When it is desired to throw the clutch out of gear the cam $f$ is thrown over upon its shaft $f'$, by means of the crank $f^2$, into contact with the rim $c^5$ of the clutch $c$, as shown in Fig. 3. As the clutch $c$ is revolved in that direction its frictional contact with the cam $f$ will draw the latter around, and the clutch will, by reason of the eccentricity of the cam $f$, be forced back upon the power-shaft and out of connection with the part $d$. The part $d$ is then thrown back upon the roll-shaft, and the complete disconnection of the power and roll shafts is effected.

It is evident that the form of the friction-coupling may be varied to any of the other well-known forms of such device. I do not limit myself to any particular form, but claim the use of a frictional coupling, in combination with a clutch, as a preliminary starting device for the roll-shaft.

If desired, there may be a cam, $f$, on each side of the clutch to move it evenly and prevent it binding on the head $a^2$ when moving back. Both cams may be operated from one source by connecting their levers by links, cords, or other suitable means.

An important advantage of my invention is that the connection may be made without slackening the speed of the engine, which was necessary with former clutches, and which interferes seriously with the working of other parts of the mill.

Other advantages of my invention are the prevention of the straining of the clutch and other parts, the simplicity and consequent cheapness of the device for disconnecting the clutch, both in construction and operation, and, lastly, the certainty of the operation of the parts.

In case the train of rolls is too heavy to be started by the frictional contact of the parts $c^4$ and $a^2$, no breakage or other disadvantage will result therefrom, owing to the fact that these parts will simply slip upon each other, while in all cases such frictional contact will aid the clutch device in starting the rolls and tend to prevent injury and breakage of the parts.

What I claim as my invention, and desire to secure by Letters Patent, is—

1. The combination of the sliding clutch and a cam for disconnecting the clutch from the shaft which is driven thereby, substantially as and for the purposes described.

2. The combination of a clutch with a sliding frictional bearing mounted upon a shaft, and having a counterpart or seat in the other shaft, so as to form a friction-coupling, substantially as and for the purposes described.

In testimony whereof I have hereunto set my hand.

URI HASKIN.

Witnesses:
T. B. KERR,
L. C. FITLER.